United States Patent [19]

Tobishima et al.

[11] 4,343,871

[45] Aug. 10, 1982

[54] LIGHT WEIGHT BATTERY

[75] Inventors: Shinichi Tobishima; Junichi Yamaki; Akihiko Yamaji, all of Mito, Japan

[73] Assignee: Nippon Telegraph & Telephone Public Corporation, Tokyo, Japan

[21] Appl. No.: 213,042

[22] Filed: Dec. 4, 1980

[30] Foreign Application Priority Data

| Dec. 18, 1979 | [JP] | Japan | 54-163621 |
| Dec. 18, 1979 | [JP] | Japan | 54-163622 |
| Dec. 18, 1979 | [JP] | Japan | 54-163623 |
| Jan. 17, 1980 | [JP] | Japan | 55-3801 |
| Feb. 25, 1980 | [JP] | Japan | 55-21575 |

[51] Int. Cl.$^3$ ............................................. H01M 10/40
[52] U.S. Cl. ..................................... 429/197; 429/213
[58] Field of Search ....................... 429/194, 213, 197

[56] References Cited

U.S. PATENT DOCUMENTS

| 2,306,927 | 12/1942 | Arsem | 429/213 |
| 3,060,255 | 10/1962 | Lozier | 429/213 |
| 3,185,590 | 5/1965 | Mayer et al. | 429/213 |
| 3,532,546 | 10/1970 | Harris | 429/213 |
| 3,578,500 | 5/1971 | Maricle et al. | 429/213 |

*Primary Examiner*—Donald L. Walton
*Attorney, Agent, or Firm*—Frishauf, Holtz, Goodman & Woodward

[57] ABSTRACT

A battery embodying this invention comprises an anode including an anode-active material formed of one metal selected from the Group Ia metals or preferably lithium metal, a cathode including a cathode-active material formed of organic compounds having a $\pi$-electron conjugated system, and an electrolyte prepared from a material which is chemically stable to the cathode and anode materials and permits the migration of the ion of the anode metal to the cathode for electrochemical reaction with the cathode-active material.

15 Claims, 2 Drawing Figures

LIGHT WEIGHT BATTERY

This invention relates to a batteries, and more particularly to a battery whose anode contains as the anode-active material a metal selected from the metals of Group Ia, whose cathode contains as the cathode-active material a compound selected from the group consisting of organic compounds having a $\pi$-electron conjugated system, and whose electrolyte is formed of a material which does not chemically react with the cathode and anode materials, and permits the migration of ions from the anode material to the cathode for electrochemical reactions with the cathode-active material.

Hitherto known are numerous types of high energy density battery, in which lithium is used as an anode-active material. A lithium battery is already commercially available in which a cathode-active material is formed of, for example, fluorocarbon, $Ag_2CrO_4$, $MnO_2$ or $SOCl_2$. However, the prior art lithium batteries have the drawback that their capacity and energy density are not always quite satisfactory, and that these batteries are not capable of being recharged.

Among the secondary batteries using lithium as an anode-active material, a chalcogenide battery (refer to the U.S. Pat. No. 4,009,052) has the most excellent property in which a cathode-active material is formed of the sulfides, selenides or tellurides of titanium, zirconium, hafnium, niobium, tantalum or vanadium. Among the lithium batteries, the type in which titanium disulfide $TiS_2$ is used as a cathode-active material was once on the market. Attempts proposed to date which comprise applying an organic compound as a cathode-active material include a process (refer to the specification of the U.S. Pat. No. 3,532,546) of using liquid ammonia as an electrolyte, and applying, for example, 2,4-dinitroaniline as a cathode-active material; and a process (refer to the Derwent Japanese Patents Report vol. T (1972), No. 72436T) of using liquid ammonia as an electrolyte, and nitroaniline as a cathode-active material. These processes relate to a low temperature-operated battery, because liquid ammonia has a boiling point of −33° C. Nothing is known about the property of a battery based on the application of an electrolyte other than liquid ammonia. Further proposed are the following batteries:

(a) U.S. Pat. No. Re 27,835 in which a non-aqueous solvent type battery is formed by dissolving $SO_2$ in elecrolyte to use a cathode-active material such as N,N,N',N'-tetramethyl benzidine which is soluble in a non-aqueous solvent type electrolyte.

(b) A lithium battery (U.S. Pat. No. 3,185,590) in which a cathode-active material is formed of a polymer of quinones, for example para-quinone;

(c) A lithium battery (Chemical Abstract 1,270,135 S, 1976, Vol. 85) in which a cathode-active material is formed of 2,3-dichloro-5,6-dicyano-1,4-benzoquinone;

(d) A battery (Chemical Abstract 127,012 r, 1976, Vol. 85) in which a cathode-active material is formed of bipyridine; and (e) A battery (U.S. Pat. No. 3,352,720) in which a cathode-active material formed of a complex compound of a halogen such as bromine with the nitrogen atoms of a polymeric amine such as polyvinyl pyridine.

Patents relative to a battery in which Mg or a Mg alloy is used as an anode and an aqueous solution is applied as an electrolyte include a process (the U.S. Pat. No. 2,880,122) of using organic nitro compounds such as nitrobenzotriazole as a cathode active material and a process (the U.S. Pat. No. 2,836,645) of applying 2-hydroxy-1,4-naphthoquinone or phenanthrene quinone as a cathode-active material. This invention has been proposed by way of eliminating the drawbacks of said batteries.

The primary object of this invention is to provide primary and secondary batteries, whose cathode-active material is composed of an organic compound having a $\pi$-electron conjugated system.

Another object of the invention is to provide compact, light weight primary batteries having large energy density.

Still another object of the invention is to provide secondary batteries which are capable of being discharged and charged over many cycles.

The invention is characterized in that with batteries which comprise an anode containing as the anode-active material a metal selected from the Group Ia metals, a cathode, and an electrolyte which does not chemically react with the anode and cathode materials, and permits the migration of the ions from the anode material to the cathode for an electrochemical reaction with the cathode-active material, the cathode material contains as the cathode-active material a compound selected from the group consisting of organic compounds having a $\pi$-electron conjugated system.

This invention can be more fully understood from the following detailed description when taken in conjunction with the accompanying drawings, in which.

Figure 1:
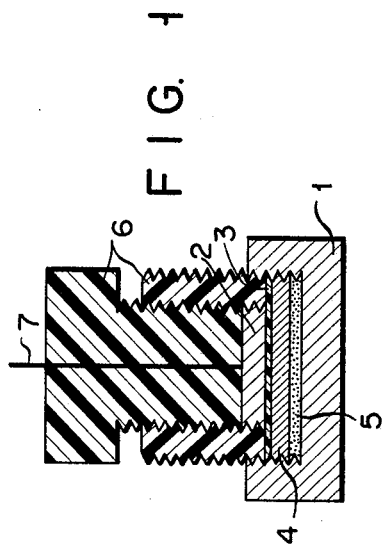
FIG. 1 is a vertical sectional view of a battery embodying this invention.

There will now be described the cathode, anode and electrolyte of a battery according to a preferred embodiment of this invention.

The cathode is prepared from a compound selected from a group of organic compounds having a $\pi$-electron conjugated system. To describe in greater detail, the cathode should preferably be formed of a compound selected from the following three groups of organic compounds:

(1) Organic compounds having at least one —$NO_2$ group and $\pi$-electron conjugated system preferably include 2,4,7-trinitro-9-fluorenone (TNF)
2,4,5,7-tetranitro-9-fluorenone (TENF)
N-methyl-N,2,4,6-tetranitroaniline (also referred to as nitramine or tetryl)
o-nitrobenzonitrile
m-nitrobenzonitrile
p-nitrobenzonitrile
p-nitrobenzophenone
nitrobenzotriazole
p-nitrobenzoyl chloride
m-nitrobenzoyl chloride
γ-(p-nitrobenzyl) pyridine (2) Organic metal complex compounds having a $\pi$-electron conjugated system preferably include:

ferric benzoyl acetonate [also referred to as tris(1-phenyl-1,3-butanediono) iron]
bis(8-oxyquinoline) copper (II)
tris(2-oxy-1,4-naphthoquinone) cobalt (III)

bis(2-oxy-1,4-naphthoquinone) cobalt (II)
bis(2-oxy-1,4-naphthoquinone) iron (II)
bis(salicyl aldiminate) copper (II)
tris(salicyl aldiminate) iron (III)
copper (II) complex of cupferron
beryllium acetyl acetonate
iron (III) acetyl acetonate
cobalt (III) acetyl acetonate
cobalt (II) acetyl acetonate
iron (II) naphthoquinate (3) Organic compounds having a $\pi$-electron conjugated system and the ability of forming a complex compound with a metal preferably include 9,10-phenanthrene quinone
1,10-phenanthroline
fluorenone
$\alpha$-naphthoquinoline
$\beta$-naphthoquinoline
2-hydroxy-1,4-naphthoquinone
cupferron The cathode of the battery of this invention is formed by any of the following processes:

(a) pressing a powder of any of the above-listed cathode-active materials or a mixture of said powder and a powder of polytetrafluoroethylene binder in the form of a film on a support of, for example, nickel or stainless steel;

(b) mixing a powder of the cathode-active material with an inert electrically conductive powder of, for example, acetylene black, graphite, carbon, or nickel to render to mixed mass electrically conductive, further putting said mixture in a metal vessel with or without a powder of binder such as polytetrafluoroethylene and compressing the mixed mass; and (c) mixing the mixture of a powder of the cathode-active material and inert electrically conductive powder in a solution or an emulsion of a binder and spreading the resultant mixture on a support of, for example, nickel or stainless steel in the form of a film, followed by drying.

One example of this invention is to mix preferably 200% by weight or less of acetylene black based on the above described cathode-active material and the said cathode-active material with an electrolyte and use the resultant pasty mass as cathode of the battery of the invention. Another example is to mix the cathode-active material with preferably about 10% by weight of a powder of polytetrafluoroethylene binder and preferably 200% by weigh or less of acetylene black based on the cathode-active material and press the mixture into a pellet at room temperature for use as the cathode of said battery.

With reference to the characteristics of a primary battery, the cathode-active material is demanded to have a high discharge energy density. From this standpoint, the following compounds which have a high discharge energy density are particularly preferred as cathode-active materials:

2,4,7-trinitro-9-fluorenone
2,4,5,7-tetranitro-9-fluorenone
N-methyl-N,2,4,6-tetranitroaniline
m-nitrobenzonitrile
ferric benzoyl acetonate The compounds listed below are also preferred for the above-mentioned requirement:

p-nitrobenzonitrile
p-nitrobenzophenone
p-nitrobenzoyl chloride
nitrobenzotriazole
$\gamma$-(p-nitrobenzyl) pyridine
9,10-phenanthrene quinone
bis(8-oxyquinoline) copper (II)
bis(salicyl aldiminate) copper (II)

With regard to the charge-discharge characteristics of a cathode-active material used as a secondary battery, the following compounds are particularly preferred.

ferric benzoyl acetonate
2,4,7-trinitro-9-fluorenone
9,10-phenanthrene quinone
N-methyl-N,2,4,6-tetranitroaniline
p-nitrobenzoyl chloride There will now be described the anode of a battery embodying this invention. The anode-active material of the battery is formed of a metal selected from Group Ia metals, mixtures of said metals themselves or mixtures thereof with any other material. The anode-active material should preferably be formed of lithium. These anode-active materials are used as the anode in the form of a sheet or a sheet pressed on a metal net.

There will now be described the electrolyte of the battery of this invention.

The electrolyte should be a material which is chemically stable to the cathode and anode materials, and permits the migration of the ions of an anode metal to the cathode for electrochemical reaction with the cathode-active material. The electrolyte of the battery of the invention may be used in the form dissolved in a suitable solvent, or in solid or molten form. The ion-conducting species of the electrolyte is desired to be the ion of an anode metal.

Particularly effective electrolytes are preferably $LiClO_4$, $LiBF_4$, $LiPF_6$, $LiAsF_6$, $KClO_4$, $NaClO_4$, sodium $\beta$-alumina and LiCL. Where the electrolyte is used in the form dissolved in a solvent, then said solvent should preferably be ketones, ethers, esters, organic lactones, organic nitriles, organic carbonates, nitrohydrocarbons and mixtures thereof. The solvent may be formed of, for example, propylene carbonate or a mixture of 50% of propylene carbonate and 50% of 1,2-dimethoxy ethane.

A battery manufactured as described above has a large discharge capacity per unit weight of a cathode-active material, providing a light weight battery. The undermentioned example in which 2,4,7-trinitro-9-fluorenone is applied as a cathode-active material provides a battery having a discharge capacity about 6, 2 and 8 times larger than $MnO_2$, fluoro carbon $[(CF)_n]$ and $TiS_2$ respectively used as a cathode-active material in the conventional battery.

This invention will be more fully understood by reference to the examples which follow.

In Examples 1 to 16, an organic compound having at least one $-NO_2$ group and $\pi$-electron conjugated system is used as a cathode-active material. In Examples 17 to 24 and 30, an organic metal complex compound having a $\pi$-electron conjugated system is used as a cathode-active material. In Examples 25 to 30, a compound selected from a group of organic compounds which have a π-electron conjugated system and the ability of forming a complex compound with a metal is used as a cathode-active material. All the examples indicate the prominent characteristic of a Li battery embodying this invention.

Cathode-active materials applied in the above-mentioned examples and materials used in synthesizing said cathode-active materials were procured from Tokyo Kasei Co., except for ferric benzoyl acetonate and 2,4,5,7-tetranitro-9-fluorenone imported from Aldrich Inc. of the United States. Throughout the examples, the discharge capacity and energy density were determined per unit weight of a cathode-active material, unless particularly noted.

EXAMPLE 1

FIG. 1 is a vertical sectional view of a battery embodying this invention. Reference numeral 1 denotes a nickel-plated brass vessel provided with a circular recess having a diameter of 25 mm. 2 is a circular lithium anode plate having a diameter of 20 mm, 3 a circular porous polypropylene separator having a diameter of 25 mm; 4 a circular carbon fiber felt having a diameter of 25 mm and a thickness of 3 mm; 5 a cathode mixture; 6 a polytetrafluoroethylene vessel; and 7 a nickel lead wire. The cathode mixture 5 placed in the circular recess of the brass vessel 1. The circular carbon fiber felt 4 to be impregnated with electrolyte is mounted on said cathode mixture 5. The mass was compressed with one of the polytetrafluoroethylene vessel 6. The lithium anode 2 was set on the compressed mass with the porous polypropylene separator 3 interposed therebetween. The electrolyte used was formed of a 1 mole/l solution (2 to 5 cc) of LiClO$_4$ dissolved in propylene carbonate which was distilled and later dehydrated by adding molecular sieves. The porous polypropylene separator 3 and carbon fiber felt 4 were impregnated with the electrolyte thus prepared. The cathode mixture 5 was prepared by mixing 0.05 g of a powder of 2,4,7-trinitro-9-fluorenone and 0.05 g of a powder of acetylene black with said electrolyte. A lithium sheet was used as the anode 2 with the porous polypropylene separator 3 disposed between said anode 2 and the carbon fiber felt 4.

A battery thus constructed was discharged at a constant current by means of a galvanostat. The discharge voltage of the battery was measured by a high input impedance type voltmeter. The output from the voltmeter was recorded on a pen recorder.

Figure 2:
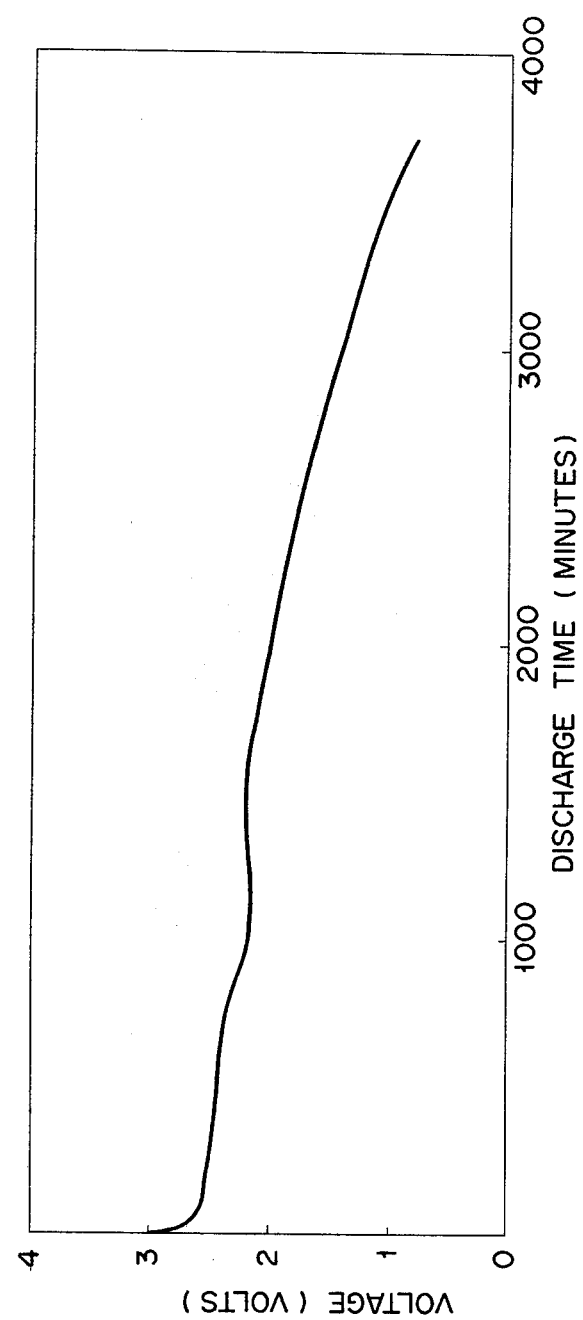
FIG. 2 is a curve diagram showing the relationship between the discharge time and the battery voltage of this invention.

The battery constructed as described above continued to be discharged 59 hours at a current of 1.57 mA until the voltage dropped to 1 volt. In this case, the cathode-active material has a discharge capacity of 1,835 ampere-hour (Ah)/kg. The average voltage was 1.60 volts. The energy density was 2,940 watt-hour (Wh)/kg. The open circuit voltage of the battery was 3.15 volts. FIG. 2 is a discharge curve diagram, showing variation in the voltage of said battery during the above-mentioned discharge.

EXAMPLE 2

A cathode mixture 5 was prepared by mixing the same type of electrolyte as described above with 0.05 g of a powder of 2,4,7-trinitro-9-fluorenone and 0.05 g of a powder of acetylene black in order to manufacture a battery shown in FIG. 1.

With a battery manufactured as described above, a constant current discharge was carried out with a discharge current set at different levels as 0.5 mA, 1.57 mA, 3.14 mA, 4.71 mA and 7.80 mA, the results being set forth in Table 1 below. The discharge capacity and energy density given in Table 1 represent values indicated until the battery voltage falls to 1 volt. Since the discharge capacity and energy density reach maximum values at the 1.57 mA discharge, it is preferred to carry out discharge with a discharge current set at 0.5 to 3.14 mA, in case 2,4,7-trinitro-9-fluorenone is used as a cathode-active material.

TABLE 1

| Discharge current (mA) | Discharge capacity (Ah/kg) | Energy density (Wh/kg) |
|---|---|---|
| 0.5 | 961 | 2,005 |
| 1.57 | 1,835 | 2,940 |
| 3.14 | 880 | 1,300 |
| 4.71 | 750 | 1,350 |
| 7.80 | 260 | 490 |

EXAMPLE 3

A cathode mixture 5 was prepared by mixing the same type of electrolyte as described above with a powder of 2,4,7-trinitro-9-fluorenone and a powder of acetylene black blended together in the proportions given in Table 2 below in order to manufacture a battery shown in FIG. 1. Table 2 below indicates the discharge capacity and energy density of the 2,4,7-trinitro-9-fluorenone which were measured until said battery was discharged at the rate of 1 mA down to 1 volt.

TABLE 2

| 2,4,7-trinitro-9-fluorenone (g) | Acetylene black (g) | Discharge capacity of an active material indicated until the voltage fell to 1 volt (Ah/kg) | Energy density of an active material indicated until the voltage fell to 1 volt (Wh/kg) | Energy density of a cathode mixture indicated until the voltage fell to 1 volt (Wh/kg) |
|---|---|---|---|---|
| 0.11 | 0.10 | 550 | 1,100 | 550 |
| 0.05 | 0.10 | 750 | 1,537 | 512 |
| 0.03 | 0.10 | 850 | 1,785 | 412 |

The active material given in Table 2 above denotes 2,4,7-trinitro-9-fluorenone. The cathode mixture is formed of 2,4,7-trinitro-9-fluorenone blended with acetylene black. From the energy density per unit amount of the cathode mixture, it is preferred that the 2,4,7-trinitro-9-fluorenone be added at the rate of 0.05 g or more per 0.1 g of acetylene black, namely, 200% by weight or less of the acetylene black based on the 2,4,7-trinitro-9-fluorenone be added to the 2,4,7-trinitro-9-fluorenone.

EXAMPLE 4

A battery shown in FIG. 1 was manufactured in substantially the same manner as in Example 1, except that 0.015 g of 2,4,7-trinitro-9-fluorenone and 0.025 g of acetylene black were blended with the following electrolyte to provide a cathode mixture. The electrolyte used was formed of a 1 mole/l solution of LiClO₄ dissolved in a mixture consisting of 1,2-dimethoxy ethane and propylene carbonate mixed in the volumetric ratio of 1:1 which was distilled and later dehydrated.

With the battery thus manufactured, constant current discharge was carried out at 1 mA for 4 hours. Later, constant current charge was carried out at 1 mA for 4 hours each time, indicating a charge discharge capacity of 267 Ah/kg. After the first 4-hour discharge, the voltage of the battery stood at 2.1 volts. After the fifth 4-hour discharge, the voltage indicated 1.4 volts. After the tenth 4-hour discharge, the voltage showed 1 volt. After the twentieth 4-hour discharge, the voltage also indicated 1 volt. This event proves that a system allowing for stable charge and discharge was produced in the battery during the 10th and subsequent discharge tests.

EXAMPLES 5 TO 14

A battery illustrated in FIG. 1 was manufactured in substantially the same manner as in Example 1, except that cathode-active materials having kinds and amounts shown in Table 3 below and acetylene black having amounts indicated therein were blended with the same type of electrolyte as used in Example 1 to provide a cathode mixture.

With the battery thus manufactured, constant current discharge was carried out at 1 mA, until the battery voltage dropped to 1 volt (Examples 5 to 8), and also until the battery voltage fell to 2 volts (Examples 9 to 14). Table 3 below shows the discharge capacity and energy density which were indicated until the battery voltage was reduced to 1 volt (Examples 5 to 8) and also to 2 volts (Examples 9 to 14).

With the battery thus manufactured, constant current discharge was carried out at 1 mA for 4 hours. Later, constant current charge was carried out at 1 mA for 4 hours, indicating a charge discharge capacity of 100 Ah/kg. This cycle of discharge and charge was repeated. After the first 4-hour discharge, the battery voltage stood at 2.60 volts. After the fifth 4-hour discharge, the battery voltage indicated 2.40 volts. After the tenth 4-hour discharge, the battery voltage showed 2.24 volts.

EXAMPLE 16

A battery shown in FIG. 1 was manufactured in substantially the same manner as in Example 1, except that 0.025 g of p-nitrobenzoyl chloride and 0.04 g of acetylene black were blended with the same type of electrolyte as used in Example 1 to provide a cathode mixture. With the battery thus manufactured, constant current discharge was carried out at 1 mA for 5 hours, indicating a discharge capacity of 200 Ah/kg. Later, constant current charge was carried out at 1 mA for 5 hours, indicating a charge capacity of 200 Ah/kg. This cycle of discharge and charge was repeated. At the first cycle test, a discharge capacity until 1 volt stood at 192 Ah/kg. At the seventh cycle test, a discharge capacity until 1 volt indicated 180 Ah/kg. At the tenth cycle test, a discharge capacity until 1 volt showed 180 Ah/kg. At the fourteenth cycle test, a discharge capacity until 1 volt indicated 160 Ah/kg.

EXAMPLES 17 TO 20

A battery shown in FIG. 1 was manufactured in substantially the same manner as in Example 1, except that cathode-active materials having kinds and amounts given in Table 4 below and acetylene black having

TABLE 3

| Example | Cathode-active material Compound | Amount (g) | Acetylene Black Amount (g) | OCV* (V) | Discharge capacity (Ah/kg) | Energy density (Wh/kg) |
|---|---|---|---|---|---|---|
| 5 | 2,4,5,7-tetranitro-9-fluorenone | 0.03 | 0.1 | 3.35 | 958 | 1,913 |
| 6 | N-methyl-N,2,4,6-tetranitroaniline | 0.1 | 0.1 | 3.04 | 930 | 1,994 |
| 7 | p-nitrobenzoyl chloride | 0.05 | 0.05 | 3.33 | 530 | 1,290 |
| 8 | m-nitrobenzoyl chloride | 0.05 | 0.05 | 3.10 | 400 | 890 |
| 9 | o-nitrobenzonitrile | 0.05 | 0.05 | 2.40 | 240 | 536 |
| 10 | m-nitrobenzonitrile | 0.05 | 0.05 | 3.10 | 740 | 1,610 |
| 11 | p-nitrobenzonitrile | 0.05 | 0.05 | 3.05 | 500 | 1,116 |
| 12 | p-nitrobenzophenone | 0.05 | 0.05 | 3.05 | 430 | 967 |
| 13 | γ-(p-nitrobenzyl)pyridine | 0.05 | 0.05 | 3.15 | 400 | 1,093 |
| 14 | 5-nitrobenzotriazole | 0.05 | 0.05 | 3.05 | 450 | 895 |

*Open circuit voltage.

EXAMPLE 15

A battery shown in FIG. 1 was manufactured in substantially the same manner as in Example 1, except that 0.04 g of N-methyl-N,2,4,6-tetranitroaniline and 0.05 g of acetylene black were mixed with the same type of electrolyte as used in Example 1 to provide a cathode mixture.

amounts shown therein were blended with the same type of electrolyte as used in Example 1 to provide a cathode mixture. The open circuit voltage of the battery is also set forth in Table 4.

With the battery thus manufactured, constant current discharge was carried out at 1 mA, until the battery voltage dropped to 1 volt. Table 4 also indicates the discharge capacity and energy density indicated until the battery voltage fell to 1 volt.

TABLE 4

| Example | Cathode-active material Compound | Amount (g) | Acetylene Black Amount (g) | OCV[(1)] (V) | Discharge capacity (Ah/kg) | Energy density (Wh/kg) |
|---|---|---|---|---|---|---|
| 17 | ferric benzoyl acetonate | 0.05 | 0.05 | 3.15 | 910 | 1,367 |

TABLE 4-continued

| Example | Cathode-active material Compound | Amount (g) | Acetylene Black Amount (g) | OCV[1] (V) | Discharge capacity (Ah/kg) | Energy density (Wh/kg) |
|---|---|---|---|---|---|---|
| 18 | bis(8-oxy-quinoline) copper (II)[2] | 0.05 | 0.1 | 3.12 | 1,000 | 1,631 |
| 19 | tris(2-oxy-1,4-naphthoquinone) cobalt (III)[3] | 0.05 | 0.05 | 3.08 | 610 | 966 |
| 20 | bis(salicyl aldiminate) copper (II)[4] | 0.05 | 0.05 | 2.90 | 650 | 1,540 |

Note:
[1] Open circuit voltage.
[2] Obtained by adding copper acetate to an alcohol solution of 8-hydroxyquinoline, heating the mass for sometimes on a water bath, separating a precipitate produced in the alcohol solution by a filtration and recrystallizing the precipitate by using a hot alcohol.
[3] Synthesized as in Example 18 from 2-hydroxy-1,4-naphthoquinone and cobalt acetate.
[4] Obtained in the form of a precipitate after the process of adding ammonia water and cobalt (II) acetate to an alcohol solution of salicyl aldehyde, and thereafter heating the mass.

EXAMPLE 21

0.05 g of ferric benzoyl acetonate powder and 0.05 g of acetylene black were blended with the same type of electrolyte as used in Example 1 to provide a cathode mixture, thereby manufacturing a battery shown in FIG. 1. With the battery thus manufactured, constant current discharge was carried out, with a discharge current set at 1 mA, 1.57 mA, 3.14 mA and 4.71 mA, the results of the tests being set forth in Table 5 below.

TALBE 5

| Discharge current (mA) | Discharge capacity (Ah/kg) | Energy density (Wh/kg) |
|---|---|---|
| 1 | 910 | 1,370 |
| 1.57 | 570 | 760 |
| 3.14 | 150 | 210 |
| 4.71 | 180 | 260 |

The discharge capacity and energy density indicated in Table 5 above represent values indicated until the battery voltage dropped to 1 volt. As seen from Table 5, the discharge capacity and energy density indicate larger values at smaller discharge currents. Where, therefore, ferric benzoyl acetonate is applied as a cathode-active material, it is preferred to carry out discharge at a smaller discharge current than 1.57 mA.

EXAMPLE 22

A battery shown in FIG. 1 was manufactured in substantially the same manner as in Example 1, except that 0.03 g of ferric benzoyl acetonate and 0.03 g of acetylene black were blended with the same type of electrolyte as used in Example 1 to provide a cathode mixture. With the battery thus manufactured, constant current discharge was carried out at 1 mA for 1.5 hours, indicating a discharge capacity of 50 Ah/kg. Later, constant current charge at 1 mA for 1.5 hours was carried out, indicating a charge capacity of 50 Ah/kg. The above-mentioned cycle of discharge and charge was repeated 120 times.

Since the discharge capacity of a cathode-active material indicated until the battery voltage dropped to 1 volt stood at 910 Ah/kg, the above-mentioned cycle of charge and discharge correspond to a 5.5% capacity. At the first discharge test, a minimum discharge voltage indicated 1.51 volts. At the fiftieth discharge test, a minimum discharge voltage showed 1.86 volts. At the ninetieth discharge test, a minimum discharge voltage indicated 1.78 volts. At the last discharge test, a minimum discharge voltage gave 1.41 volts.

EXAMPLE 23

A battery shown in FIG. 1 was manufactured in substantially the same manner as in Example 1, except that 0.01 g of ferric benzoyl acetonate and 0.03 g of acetylene black were blended with the same type of electrolyte as used in Example 1 to provide a cathode mixture.

With the battery thus manufactured, constant current discharge was carried out at 1 mA for 5 hours, indicating a discharge capacity of 500 Ah/kg. Later, constant current charge was carried out at 1 mA for 5 hours, indicating a charge capacity of 500 Ah/kg. The above-mentioned cycle of discharge and charge was repeated 98 times.

Since the discharge capacity of a cathode-active material indicated until the battery voltage dropped to 1 volt was 910 Ah/kg, the above-mentioned cycle of charge and discharge correspond to a 55% capacity. At the first discharge test, a minimum discharge voltage was 1.31 volts. At the fortieth discharge test, a minimum discharge voltage was 1.09 volts. At the eightieth discharge test, a minimum discharge voltage was 1.08 volts. At the last discharge test, a minimum discharge voltage was 1.20 volts.

EXAMPLE 24

A battery shown in FIG. 1 was manufactured in substantially the same manner as in Example 1, except that 0.03 g of tris(2-oxy-1,4-naphthoquinone) cobalt (III) and 0.03 g of acetylene black were mixed with the same type of electrolyte as used in Example 1 to provide a cathode mixture.

With the battery thus manufactured, constant current discharge was carried out at 1 mA for 6 hours, indicating a discharge capacity of 200 Ah/kg. After a pause of 1 hour, constant current charge was carried out at 1 mA for 6 hours, indicating a charge capacity of 200 Ah/kg. The charge was stopped for 1 hour. This cycle of discharge and charge was repeated. After the first 6-hour discharge test, the battery voltage stood at 0.80 volt. After the third 6-hour discharge test, the battery voltage indicated 1.10 volts. After the fourth 6-hour discharge test, the battery voltage showed 1.20 volts. After the sixth 6-hour discharge test, the battery voltage gave 0.95 volts.

EXAMPLES 25 AND 26

A battery shown in FIG. 1 was manufactured in substantially the same manner as in Example 1, except that cathode-active materials having kinds and amounts shown in Table 6 below and acetylene black having amounts indicated therein were blended with the same type of electrolyte as used in Example 1 to provide a cathode mixture. Table 6 below also shows the open circuit voltage of the battery thus manufactured.

With said battery, constant current discharge was carried out at 1 mA, until the battery voltage fell to 1 volt. The discharge capacity and energy density indicated until the battery voltage was reduced to 1 volt are set forth in Table 6 below.

TABLE 6

| Example | Cathode-active material Compound | Amount (g) | Acetylene Black Amount (g) | OCV* (V) | Discharge capacity (Ah/kg) | Energy density (Wh/kg) |
| --- | --- | --- | --- | --- | --- | --- |
| 25 | 9,10-phenanthrene quinone | 0.03 | 0.1 | 2.82 | 520 | 1,130 |
| 26 | 2-hydroxy-1,4-naphthoquinone | 0.05 | 0.05 | 2.90 | 410 | 801 |

*Open circuit voltage.

EXAMPLE 27

A cathode mixture was prepared by mixing the same type of electrolyte as used in Example 1 with 9,10-phenanthrene quinone powder and acetylene black blended together in the proportions given in Table 7 below in order to manufacture a battery shown in FIG. 1.

Table 7 sets forth the discharge capacity and energy density of the 9,10-phenanthrene quinone indicated until the battery voltage decreased to 1 volt. The 9,10-phenanthrene quinone given in Table 7 denotes a cathode-active material. As determined from the energy density per unit weight of the cathode mixture (9,10-phenanthrene quinone and acetylene black), it is preferred that more than 0.1 g of said 9,10-phenanthrene quinone be mixed with 0.1 g of acetylene black, namely, less than 200% by weight of acetylene black be added to the 9,10-phenanthrene quinone.

TABLE 7

| 9,10-phenanthrene quinone (g) | Acetylene black (g) | Discharge capacity of the cathode-active material indicated until the battery voltage dropped to 1 volt (Ah/kg) | Energy density of the cathode-active material indicated until the battery voltage fell to 1 volt (Wh/kg) | Energy density of the cathode mixture indicated until the battery voltage was reduced to 1 volt (Wh/kg) |
| --- | --- | --- | --- | --- |
| 0.1 | 0.1 | 320 | 710 | 355 |
| 0.03 | 0.06 | 350 | 773 | 257 |
| 0.03 | 0.1 | 519 | 1,130 | 261 |

EXAMPLE 28

A battery shown in FIG. 1 was manufactured in substantially the same manner as in Example 1, except that 0.04 g of 9,10-phenanthrene quinone and 0.10 g of acetylene black were blended with the same type of electrolyte as used in Example 1 to provide a cathode mixture. With the battery thus manufactured, constant current discharge was carried out at 1 mA for 7 hours. Later, constant current charge was carried out at 1 mA for 7 hours, indicating a charge discharge capacity of 233 Ah/kg. This cycle of discharge and charge was repeated. The discharge capacity until 2 volts at the first discharge test indicated 175 Ah/kg. The discharge capacity until 2 volts at the fourth discharge test was 133 Ah/kg. The discharge capacity until 2 volts at the fifth discharge test was 125 Ah/kg.

EXAMPLE 29

A battery shown in FIG. 1 was manufactured in substantially the same manner as in Example 1, except that 0.03 g of 2-hydroxy-1,4-naphthoquinone and 0.03 g of acetylene black were blended with the same type of electrolyte as used in Example 1 to provide a cathode mixture.

With the battery thus manufactured, constant current discharge was carried out at 1 mA for 6 hours, indicating a discharge capacity of 200 Ah/kg. After a pause of 1 hour, constant current charge was carried out at 1 mA for 6 hours, indicating a charge capacity of 200 Ah/kg. The charge was stopped for 1 hour. This cycle of discharge and charge was repeated. After the 6-hour discharge of the first test cycle, the battery voltage stood at 2.20 volts. After the 6-hour discharge of the fourth test cycle, the battery voltage indicated 1.68 volts. After the 6-hour discharge of the eighth test cycle, the battery voltage showed 1.10 volts. After the 6-hour discharge of the twenty-first test cycle, the battery voltage was 0.68 volt.

EXAMPLE 30

A battery shown in FIG. 1 was manufactured in substantially the same manner as in Example 1, except that 0.1 g of each of the cathode-active materials listed in Table 8 below and 0.1 g of acetylene black were blended with the same type of electrolyte as used in Example 1 to provide a cathode mixture.

With the batteries thus manufactured, constant current discharge was carried out at 1 mA, until the battery voltage dropped to 1 volt. The tested batteries indicated the open circuit voltage, the discharge capacity, energy density and average voltage listed in Table 8 below.

TABLE 8

| Cathode-active material | OCV* (V) | Discharge capacity (Ah/kg) | Energy density (Wh/kg) | Average voltage (V) |
| --- | --- | --- | --- | --- |
| Bis(2-oxy-1,4-naphthoquinone) | 3.25 | 130 | 244 | 1.88 |

TABLE 8-continued

| Cathode-active material | OCV* (V) | Discharge capacity (Ah/kg) | Energy density (Wh/kg) | Average voltage (V) |
|---|---|---|---|---|
| copper (II) | | | | |
| Bis(2-oxy-1,4-naphthoquinone) iron (II) | 2.35 | 280 | 484 | 1.79 |
| Tris (salicyl aldiminate) iron (II) | 3.40 | 455 | 665 | 1.46 |
| Copper (II) complex of cupferron | 3.03 | 310 | 441 | 1.42 |
| Beryllium acetyl acetonate | 3.15 | 130 | 153 | 1.18 |
| Iron (III) acetyl acetonate | 2.68 | 235 | 353 | 1.50 |
| Cobalt (III) acetyl acetonate | 3.25 | 315 | 495 | 1.57 |
| Cobalt (II) acetyl acetonate | 2.90 | 430 | 648 | 1.51 |
| α-naphthoquinoline | 3.10 | 112 | 155 | 1.38 |
| β-naphthoquinoline | 2.40 | 130 | 187 | 1.44 |
| Cupferron | 2.95 | 420 | 585 | 1.39 |
| 1,10-phenanthroline | 2.90 | 450 | 640 | 1.43 |
| Fluorenone | 2.95 | 165 | 267 | 1.62 |

*Open circuit voltage.

What we claim is:

1. A light weight battery which comprises:
   an anode containing one metal selected from the Group Ia metals;
   a cathode containing one compound selected from the group consisting of organic compounds having a π-electron conjugated system; and
   an electrolyte which does not chemically react with the anode and cathode materials, and permits the migration of the ions of the anode material to the cathode for electrochemical reaction with the cathode-active material.

2. The battery according to claim 1, wherein the cathode contains one compound selected from the group consisting of organic compounds having at least one —NO$_2$ group and a π-electron conjugated system.

3. The battery according to claim 2, wherein the cathode contains one compound selected from the group consisting of 2,4,7-trinitro-9fluorenone; 2,4,5,7-tetranitro-9-fluorenone; N-methyl-N,2,4,6-tetranitroaniline; o-nitrobenzonitrile; m-nitrobenzonitrile; p-nitrobenzonitrile; p-nitrobenzophenone; nitrobenzotriazole; p-nitrobenzoyl chloride; m-nitrobenzoyl chloride; and γ-(p-nitrobenzyl) pyridine.

4. The battery according to claim 2, wherein the cathode contains a mixture of 2,4,7-trinitro-9-fluorenone and 200% by weight or less of a powder of acetylene black based on said 2,4,7-trinitro-9-fluorenone; the anode contains lithium metal; and the electrolyte is prepared by dissolving LiClO$_4$ in propylene carbonate or a mixture of propylene carbonate and 1,2-dimethoxy ethane.

5. The battery according to claim 2, wherein the cathode contains a mixture of 2,4,5,7-tetranitro-9-fluorenone and 200% by weight or less of a powder of acetylene black based on said 2,4,5,7-tetranitro-9-fluorenone; the anode contains lithium metal; and the electrolyte is prepared by dissolving LiClO$_4$ in propylene carbonate or a mixture of propylene carbonate and 1,2-dimethoxy ethane.

6. The battery according to claim 2, wherein the cathode contains a mixture of N-methyl-N,2,4,6-tetranitroaniline and 200% by weight or less of a powder of acetylene black based on said N-methyl-N,2,4,6-tetranitroaniline; the anode contains lithium metal; and the electrolyte is prepared by dissolving LiClO$_4$ in propylene carbonate or a mixture of propylene carbonate and 1,2-dimethoxy ethane.

7. The battery according to claim 2, wherein the cathode contains a mixture of p-nitrobenzoyl chloride and 200% by weight or less of a powder of acetylene black based on said p-nitrobenzoyl chloride; the anode contains lithium metal; and the electrolyte is prepared by dissolving LiClO$_4$ in propylene carbonate or a mixture of propylene carbonate and 1,2-dimethoxy ethane.

8. The battery according to claim 1, wherein the cathode contains one compound selected from the group consisting of organic metal complex compounds having a π-electron conjugated system.

9. The battery according to claim 8, wherein the cathode contains one compound selected from the group consisting of ferric benzoyl acetonate; bis(8-oxyquinoline) copper (II); tris(2-oxy-1,4-naphthoquinone) cobalt (III); bis(2-oxy-1,4-naphthoquinone) cobalt (II); bis(2-oxy-1,4-naphthoquinone) iron (II); bis(salicyl aldiminate) copper (II); tris (salicyl aldiminate) iron (III); copper (II) complex of cupferron; beryllium acetyl acetonate; iron (III) acetyl acetonate; cobalt (III) acetyl acetonate; cobalt (II) acetyl acetonate; and iron (II) naphthoquinate.

10. The battery according to claim 8, wherein the cathode contains a mixture of ferric benzoyl acetonate and 200% by weight or less of a powder of acetylene black based on said ferric benzoyl acetonate; the anode contains lithium metal; and the electrolyte is prepared by dissolving LiClO$_4$ in propylene carbonate or a mixture of propylene carbonate and 1,2-dimethoxy ethane.

11. The battery according to claim 1, wherein the cathode contains one compound selected from the group consisting of 9,10-phenanthrene quinone; 1,10-phenanthroline; fluorenone; α-naphthoquinoline; β-naphthoquinoline; 2-hydroxy-1,4-naphthoquinone; and cupferron.

12. The battery according to any one of claims 1, 2, 8, 3, 9 or 11, wherein the anode contains lithium.

13. The battery according to claim 12, wherein the electrolyte is a solution prepared by dissolving LiClO$_4$ in propylene carbonate.

14. The battery according to claim 1, wherein the electrolyte is a solution prepared by dissolving LiClO$_4$ in propylene carbonate.

15. The battery according to claim 1, wherein the cathode contains a mixture of 9,10-phenanthrene quinone and 200% by weight or less of a powder of acetylene black based on said 9,10-phenanthrene quinone; the anode contains lithium metal; and the electrolyte is prepared by dissolving LiClO$_4$ in propylene carbonate or a mixture of propylene carbonate and 1,2-dimethoxy ethane.

* * * * *